(12) United States Patent
Hunter et al.

(10) Patent No.: US 7,249,688 B2
(45) Date of Patent: Jul. 31, 2007

(54) AUTOMATIC APPARATUS FOR STORING AND DISPENSING PACKAGED MEDICATION AND OTHER SMALL ELEMENTS

(75) Inventors: Steven N. W. Hunter, Lake Oswego, OR (US); David M. Browning, Portland, OR (US); Dennis J. Fuhrman, Corvallis, OR (US); William C. Park, IV, Kirkland, WA (US)

(73) Assignee: Omnicell, Inc., Mountain View, CA (US)

( * ) Notice: Subject to any disclaimer, the term of this patent is extended or adjusted under 35 U.S.C. 154(b) by 0 days.

(21) Appl. No.: 11/492,676

(22) Filed: Jul. 24, 2006

(65) Prior Publication Data

US 2007/0000937 A1  Jan. 4, 2007

Related U.S. Application Data

(63) Continuation of application No. 10/232,560, filed on Aug. 30, 2002, now Pat. No. 7,100,792.

(51) Int. Cl.
*G07F 11/00* (2006.01)

(52) U.S. Cl. .................... 221/79; 221/87; 221/120; 221/119

(58) Field of Classification Search ........... 414/331.01, 414/331.02, 331.05, 331.03, 331.04; 221/79, 221/87, 88, 120, 119, 9; 209/583, 587
See application file for complete search history.

(56) References Cited

U.S. PATENT DOCUMENTS

| 3,140,009 | A | 7/1964 | Wallace |
|---|---|---|---|
| 4,546,901 | A | 10/1985 | Buttrazzi |
| 5,007,518 | A | 4/1991 | Crooks et al. |
| 5,143,193 | A | 9/1992 | Geraci |
| 5,622,470 | A | 4/1997 | Schaefer et al. |
| 5,797,515 | A | 8/1998 | Liff et al. |
| 6,006,946 | A | 12/1999 | Williams et al. |
| 6,219,587 | B1 | 4/2001 | Ahlin et al. |
| 2002/0114687 | A1 | 8/2002 | Inui |

*Primary Examiner*—David H. Bollinger
(74) *Attorney, Agent, or Firm*—Townsend and Townsend and Crew LLP (57) ABSTRACT

The system includes a bin hopper which temporarily stores a plurality of small elements, such as medications. The elements are moved out of the bin and singulated into a one-by-one sequence by a series of singulating conveyors. The resulting sequence of elements is moved onto a main system conveyor where the element is identified and then moved to a loading mechanism which arranges the item so it is ready to be gripped and stored. The system includes a mass storage apparatus comprising a series of four upstanding cylindrical drums, each having a plurality of individually accessible and addressable cell storage locations for the elements. A gripping apparatus removes the elements from the loading mechanism and transfers them to a selected location in a cylindrical drum. When an article is to be dispensed, the drum is rotated so that an ejection arm comes adjacent the desired location in the drum. The ejector arm is actuated, pushing the small element out of its slot, into the center of the drum, where it falls onto a conveyor which moves the dispensed item from the system.

21 Claims, 12 Drawing Sheets

AUTOMATIC APPARATUS FOR STORING AND DISPENSING PACKAGED MEDICATION AND OTHER SMALL ELEMENTS

TECHNICAL FIELD

This invention relates generally to an apparatus for automatically receiving individually packaged medical elements, such as medications, as well as other small, packaged elements into a storage container, singulating the elements from the storage container, processing the elements for storage in individually accessible locations in a mass storage system and retrieving the stored elements from the mass storage system individually upon command.

BACKGROUND OF THE INVENTION

There are many known systems for storing and dispensing medications and other small elements. Some of these systems are entirely mechanical, with selections by the user being made by hand. Other, more recent systems are either semi-automatic or automatic, with electronic controllers. Examples of such apparatus are shown in U.S. Pat. No. 4,546,901 to Buharazzi and U.S. Pat. No. 5,797,515 to Lift et al. Another apparatus is shown in U.S. Pat. No. 6,219,587, which is assigned to the assignee of the present invention.

The systems shown in the above patents, as well as other dispensing systems, have met with varying degrees of operational success and/or commercial acceptance. Most of the automated systems are complex in design and operation, relatively large and typically quite expensive. Further, many such systems are inefficient and unreliable. They also are too slow in output. For instance, typical known commercial systems are unable to meet the medication-dispensing requirements of a large hospital.

One significant disadvantage of conventional automatic dispensing systems is that they typically must be loaded by hand. Some systems include tubes or storage sleeves which contain a plurality of one item, but these must be periodically replaced, again by hand. In other systems, the individual items/elements to be dispensed must be hand-loaded on racks or hand-placed into bins.

Further, many dispensing systems are inherently limited to either one or a relatively few packaging configurations. This is typical if the elements are in the original manufacturer's package. In other cases, the original elements are either repackaged or overpackaged for accommodation by the system. The small number of different-sized boxes which can be accommodated by a particular system is a key operational consideration. Both repackaging and overpackaging, however, are inconvenient, expensive and time-consuming, even when carried out at the healthcare facility or other facility which uses small packaged elements. There is typically a significant ambiguity if not antipathy relative to, for example, overpackaging carried out at a user's facility.

Lastly, in all medication-dispensing systems, as well as for other packaged elements, there exists the issue of returned elements which have not been used. These returns must typically be inspected and then loaded, again by hand, if suitable for restocking. In some cases, returns are handled completely separately, with the returns supplying a separate storage device apart from the main dispensing system.

It would be convenient and cost effective to have a single machine which could accept returns, along with original items from the manufacturer, process and store all the items automatically, and then dispense them automatically upon command, i.e. a single apparatus which has the capability of both storing elements, including, but not limited to, medications and other medical elements, and then dispensing them individually for use by a patient or other user.

SUMMARY OF THE INVENTION

Accordingly, the present invention is a system for automatically storing and dispensing individual elements, comprising: a bin for temporarily storing a plurality of individual elements and for depositing them one by one onto a system conveyor member which in operation moves the elements to a loading mechanism; a loading mechanism for removing the item from the conveyor and positioning it so that it is ready to be stored; a mass storage apparatus containing a plurality of individually addressable storage locations for storage of said elements; an assembly for moving the positioned elements individually in turn and storing each element in a preselected location in the mass storage apparatus; and at least one dispensing assembly for removing a selected individual element from a known location in the mass storage apparatus and for moving the dispensed element out of the system.

BEST MODE FOR CARRYING OUT THE INVENTION

Figure 1:
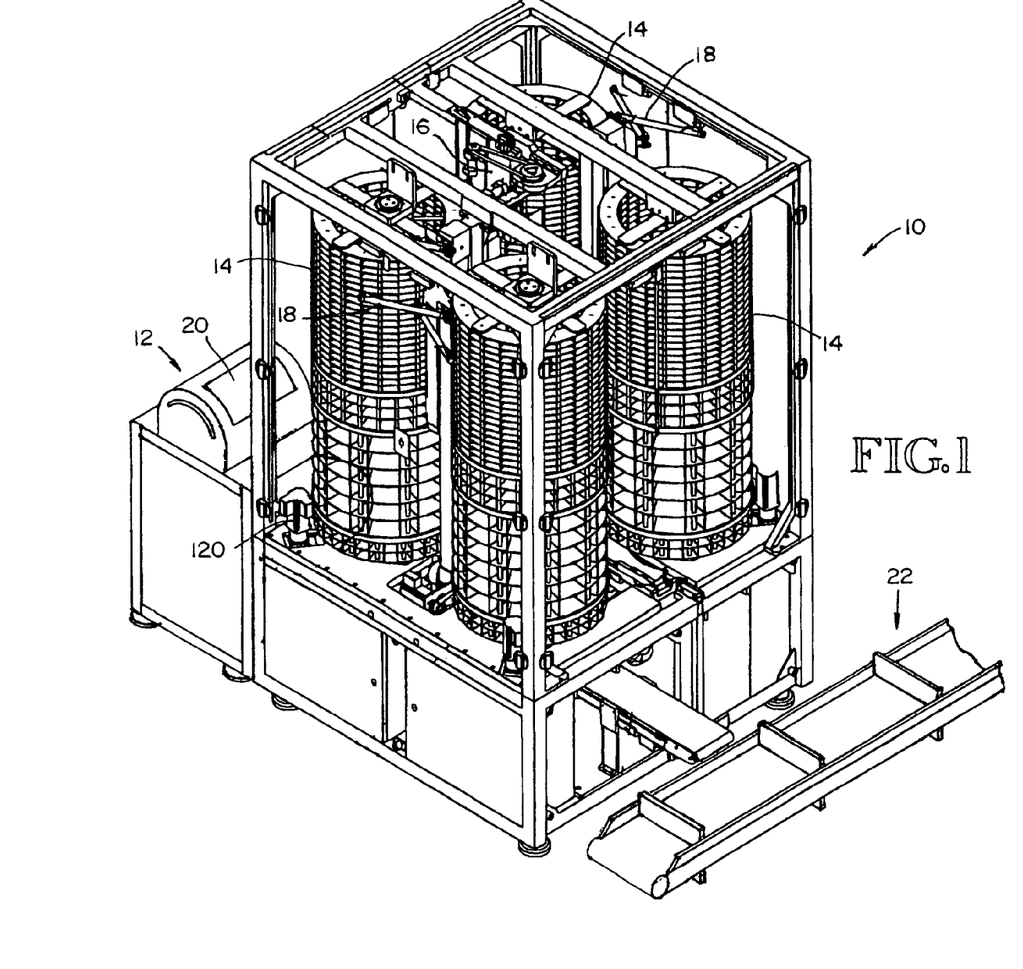
FIG. 1 is a schematic view of the complete system of the present invention, including an input hopper portion and an external conveyor apparatus.

The system of the present invention is an automatic storing and dispensing apparatus for small packaged elements, shown generally at 10, which includes an input container 12, also referred to as an input hopper, for receiving small packaged elements, such as medications, processing and then moving them into a mass storage portion of the system, comprising drum storage assemblies 14.

The individual elements, following their introduction into the apparatus, are first singulated and then moved to a loading assembly, where they are oriented, picked up by a gripper assembly 16, and moved into a selected location in drum storage assemblies 14. The embodiment shown comprises four drum storage assemblies, each assembly being a cylinder having a plurality of individually addressable/accessible slots therein, open on the exterior of the drum, for storing of individual packaged elements. The drum storage assemblies 14 are in the embodiment shown individually rotatable under computer control, as is the gripper assembly 16 which moves the individual elements into the storage devices. Each slot in the drum storage devices is uniquely identified and accessed.

The present system also includes two ejector mechanisms 18 which in the embodiment shown are located, respectively, between two adjacent drum storage assemblies, the ejector mechanisms each having the capability of accessing each cell in the two drum storage assemblies they service, by means of rotation of the drum storage assemblies and vertical movement of the ejector mechanism. The ejector mechanism includes a pusher member which operates to push the stored element in the accessed cell in the drum storage assembly toward the open center thereof. The ejected elements fall down the open center area of the drum assembly and onto an exit conveyor, are moved out of the system by the conveyor, and then onto a next stage apparatus, which in some cases could be an element handling conveyor 22 which will move the elements directly into a medication cart or to a loading device. The filled cart is ready for delivery to the patients, such as on a hospital ward (not shown).

Referring now to the drawings in detail, the apparatus 10 is capable of receiving packaged medications or other elements in bulk through a single inlet 20, similar to a mailbox door, the received medications/elements including returns of all types. The apparatus is operative to identify the element/return and move it to a stored location in the mass storage system. The system is also operative to access selected elements in the storage assemblies when selected elements are desired for dispersal.

These actions can be done in a very rapid manner, approximately seven operations per minute, in a reliable manner, by the embodiment shown. The cost of the present system, even with its substantial operational capability, is well below similar commercially available systems.

Figure 2:
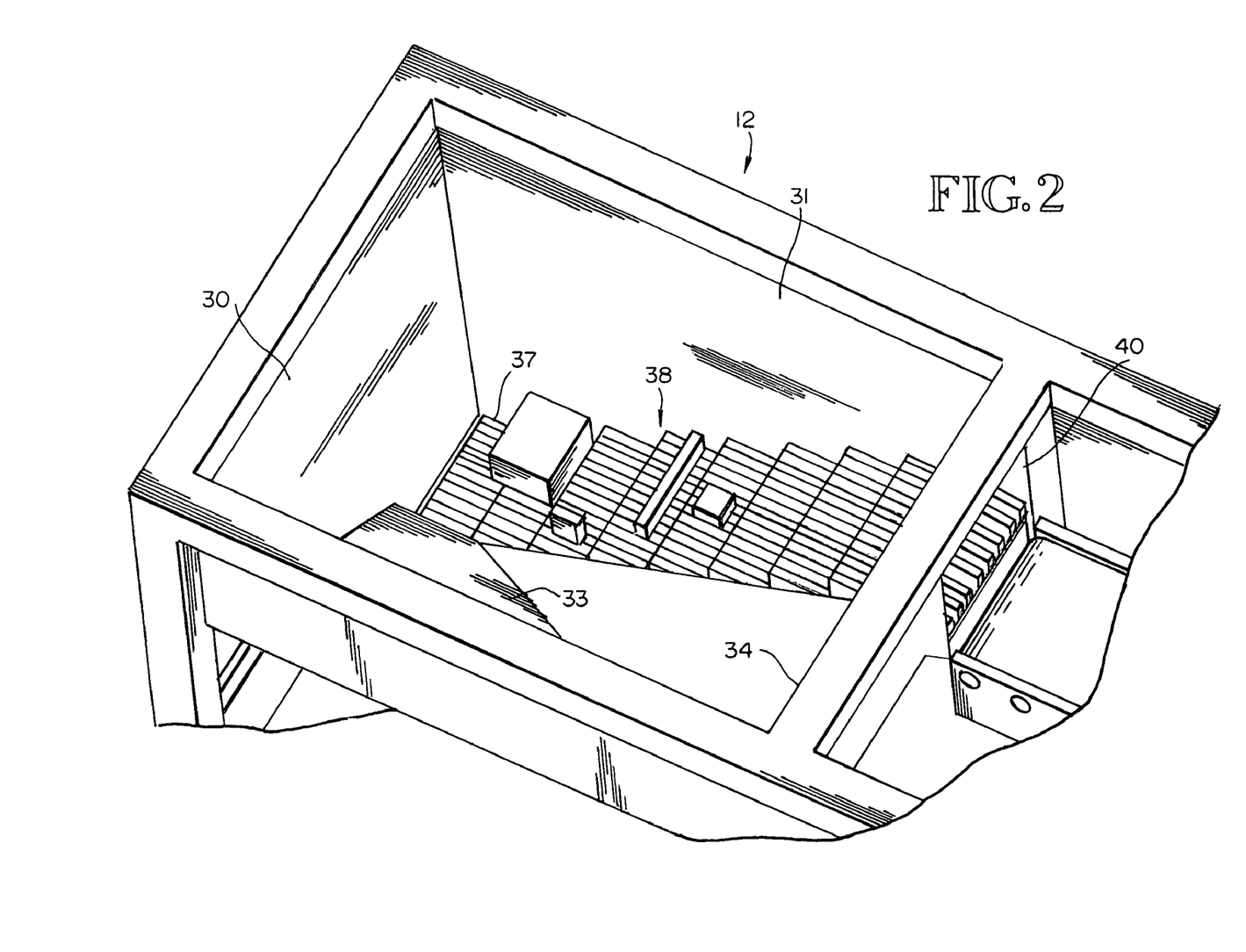
FIG. 2 is a top view showing the input hopper of the system of FIG. 1, including an input stair stepper part thereof.

The input portion of the system of the present invention, referred to as input hopper 12, includes a large, curved, slidable opening 20 at the top end thereof, approximately 16 inches long by 8 inches wide in the embodiment shown. Input hopper 12 is capable of handling up to 750 individual items, depending upon the size of the package elements, and is further capable of receiving a large number (250) at one time through opening 20.

The system of the present invention is capable of handling a variety of elements. Medications is one category, including oral medications, such as tablets and pills and liquid elements, as well as medical elements such as syringes. The system can also be used with other elements which are relatively small in size. This can include a wide variety of hardware parts, jewelry items of various kinds, and even food items.

Hence, the present invention is thus not limited to a particular type of element, although it has proven to be useful with medication-type elements.

Further, while the input may desirably be in the form of overpackaged elements, such as in particular boxes of selected sizes, with particular configurations, into which is positioned the individual packaged (or unpackaged) elements as they come from the manufacturer, it should be understood that the apparatus is also capable of handling elements received as is from the manufacturer. For medications and other elements, for instance, these manufacturers' products could include blister packs and pouches of various configurations for various solid medications, as well as vials, syringes and bulk medications. Euclid packages could be included, as well as liquid cups for handling unit doses of bulk liquids, strip packages of various sizes and arrangements, and boxes provided by the manufacturer. The flexibility of the present system, in its various arrangements, allows, if desired, the facility using the system, such as a hospital, to omit overpackaging (in which the individual element, even a packaged element, received from the manufacturer is inserted into a new package/box); and/or repackaging, in which the individual element, received from the manufacturer, is removed from the manufacturer's package and put in a new package.

The present system is described using boxes; some of the alternative packaging mentioned above will require modification of some of the structure of FIG. 1. Alternative structures will be discussed at the appropriate place below.

The input hopper 12 in the embodiment shown is a four-sided stainless steel box 27 inches wide by 21 inches long and 22 inches deep. These dimensions can, of course, be changed, but the present size is convenient for the system of the present invention and, as indicated above, accommodates approximately 700 small packaged items, which is a substantial number. While in the embodiment shown the hopper 28 is made from stainless steel, other materials could be used. The hopper could also have a different configuration.

Two adjacent interior walls 30 and 31 of the hopper are flat and vertical, while the other two walls 33 and 34 are also flat, although a portion of wall 33 extends downwardly and inwardly at an angle of approximately 30°, while a portion of wall 34 extends inwardly at approximately 45°. The angled portions of walls 33 and 34 begin approximately at or a short distance below the top edges of each wall.

Extending from the bottom 37 of hopper 20 to the upper edge of the hopper is a stairstep mechanism 38 for moving boxes 44 upwardly. Mechanism 38 exits hopper 28 through an opening 40 in wall 34. In the embodiment shown, opening 40 is nearly square, approximately 6-⅞ inches by 7 inches. The stairstep mechanism 38 comprises a set of stationary plates 42 and a set of moving plates 43, each set consisting of eight stationary and eight vertically oriented metal plates. The stationary plates alternate with the moving plates. The stationary plates 42 remain fixed, while the alternate moving plates 43 move in both the X and Y directions (forwardly and upwardly). Pneumatic cylinders (not shown) are used to drive moving plates 43 in both the X and Y directions. Each step in plates 42 and 43 in the embodiment shown has dimensions of approximately 3-½ inches (vertical) by 6-½ inches (horizontal). The moving plates in the embodiment shown move approximately 75 mm in the X (forward) direction and 50 mm in the Y (upward) direction in each movement cycle.

In the embodiment shown, each plate in both the stationary and moving sets is approximately ⅜ inches thick. Three stairs are defined in each plate in the embodiment shown. There could be fewer or greater number of stairs, depending upon the particular application. The stairstep mechanism moves individual cartons 44 up and out of the hopper 28.

FIGS. 3A-3E show the sequence of the stairstep mechanism as the moving plates 43 move in X and Y directions relative to the fixed plates 42. As indicated above, in the embodiment shown, there are eight stationary stair plates 42 in registry across the hopper. Eight moving stair plates 43 are arranged to alternate with the stationary stair plates. FIGS. 3A-3E show three stationary and moving sets of plates defining three individual stairs. The number of defined stairs can vary. The actual physical dimensions of the stationary and moving stair plates also will vary, depending upon the actual configuration of the hopper.

Figure 3A:
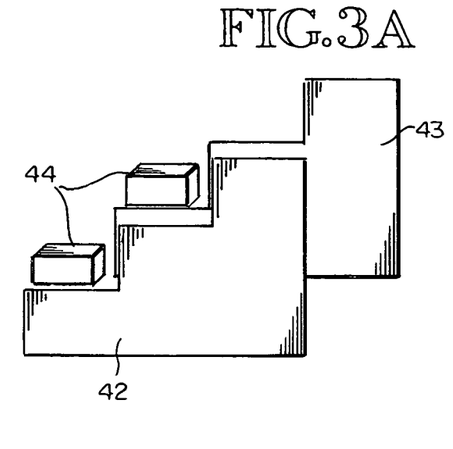
FIG. 3 is a diagram showing the operational sequence of the stair stepper portion of FIG. 2.
Figure 3B:
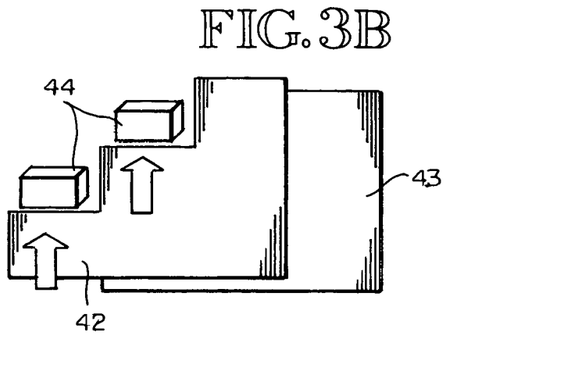
Figure 3C:
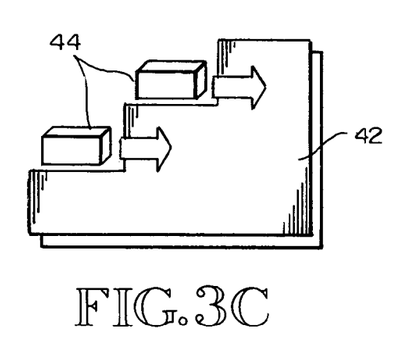
Figure 3D:
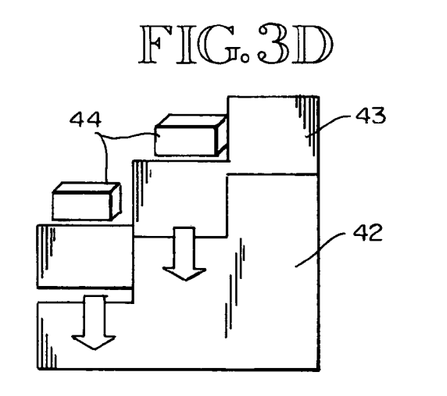
Figure 3E:
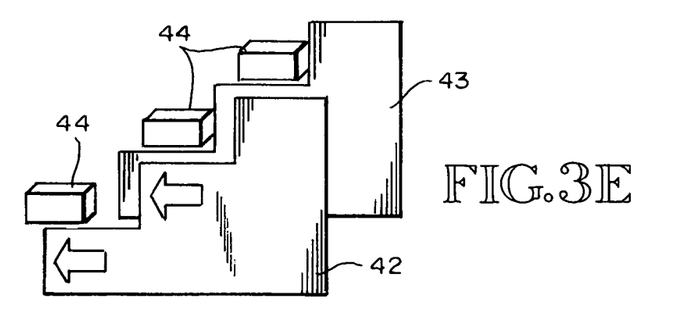

FIG. 3A shows the moving stair plates 43 at their lowest point of operation. In the first action in the sequence, the moving plates 43 will be moved upwardly. Again, in the embodiment shown, this is approximately 50 mm, and is shown in FIG. 3B of the sequence. In FIG. 3C, the moving stair plates are moved forwardly in the X direction, approximately 75 mm. At this point, a package (carton) 44 has been lifted from the bottom of the hopper to the top of the stairstep mechanism. In FIG. 3D, the moving plates 43 move downwardly a distance of 50 mm and then, as shown in FIG. 3E, move horizontally back to the starting position.

The number of actual stairs in the stairstep mechanism 38 can be varied depending upon the distance to be covered. The stairstep mechanism 38 does provide a reliable arrangement for beginning the separation of the individual packages and for moving them out of the hopper. Other systems to accomplish such a result could be used, however.

In the embodiment described in detail herein, the medical elements are generally overpackaged with boxes. However, other packaging arrangements can be used, with some modification of the system, which will be briefly described relative to the scope of the inventive concept. For instance, in addition to boxes, bags of various sizes can be used, as well as cups, blister packs, euclid packs and syringes, as discussed above.

Figure 4:
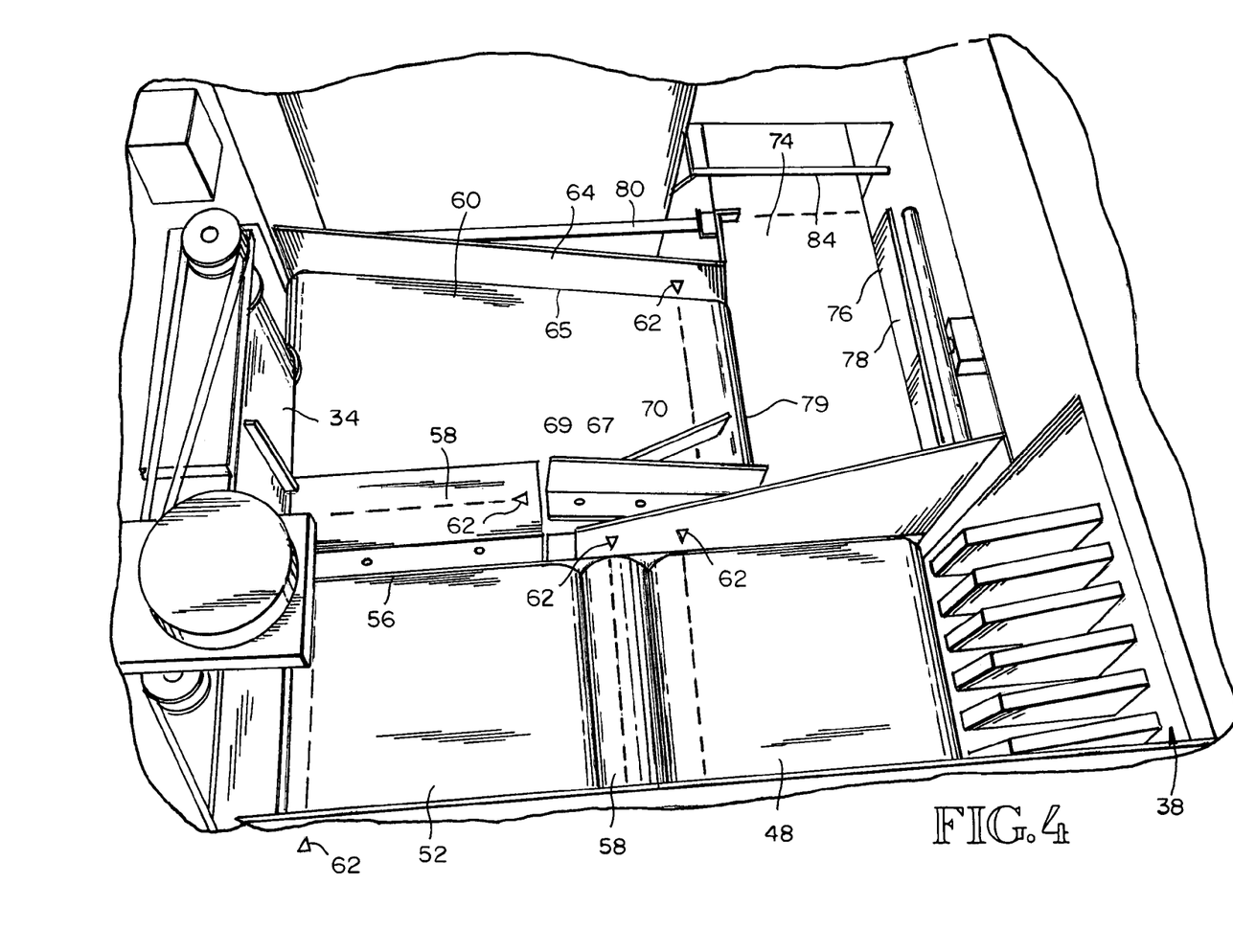
FIGS. 4-6 are several views showing the input handling of the input elements to be stored and dispensed, including singulation thereof for delivery to a main conveyor of the sorting/dispensing system of FIG. 1.

Referring to FIG. 4, the stairstep mechanism 38 operates until the packages reach the top thereof, at which point the forward movement of the stairstep pitches the packages onto a first conveyor portion 48 of a singulator assembly structure in which the packages are separated from each other longitudinally. The singulator assembly in the embodiment shown comprises a series of successive conveyors, referred to as a conveyor system. The first conveyor 48, also referred to as a buffer conveyor, is approximately 6 inches wide by 8 inches long and moves at a speed of 10 inches per second, driven by a series of pneumatic cylinders (not shown).

Following the first conveyor 48 is a cylindrical conveyor 50, referred to as a speed-up roller. Speed-up roller 50 is responsible for producing a gap between each successive package present on conveyor 48, so that each package enters the next portion of the conveying system one at a time. Speed-up roller 50 is 6 inches long by 2 inches in diameter and moves at the rate of 15 inches per second. Speed-up roller 50 passes the items to a singulating conveyor 52.

Singulating conveyor 52 is also 6 inches wide by 8 inches long and operates at specified times under computer control at 20 inches per second, by pneumatic cylinders. The buffer conveyor 48, the speed-up roller 50 and the singulating conveyor 52 are all basically co-planar and horizontal. The singulating conveyor 52 moves the items to a vertical conveyor 54, which is positioned at the far end of the singular conveyor 52, extending across the far end thereof and for a distance of 5-¾ inches beyond edge 56 of the singulating conveyor. The vertical conveyor 54 is 6 inches high and approximately 16 inches long in the embodiment shown, and runs at specified times under computer control at 10 inches per second.

Extending from edge 56 of the singulating conveyor 52, with a width of approximately 6 inches, is a short, fixed metal ramp 58. In the embodiment shown, ramp 58 is approximately 7 inches long by 3-⅜ inches wide and has a downward angle of approximately 22°. This angle can vary to some extent, but is designed to conveniently allow the packaged elements to slide onto an adjacent ramp conveyor 60, aided by the action of vertical conveyor 54.

In the package singulating process, in the event that two items move onto singulating conveyor 52 simultaneously, the action of the vertical conveyor 54 will usually separate the two items by virtue of the 90° directional change from the singulating conveyor onto the ramp 58. The ramp conveyor 60 moves in a direction 180° relative to, i.e. the opposite direction from, conveyors 48 and 52. It is approximately 6 inches wide by 16 inches long and is oriented downwardly at an angle of approximately preferably 10°, within a range of 9°-11°. The vertical conveyor 54 extends to approximately half the width of the ramp conveyor. Ramp conveyor 60 is bounded by a short wall 64 along its far edge 65, and also by a short wall 67 along an end portion of its near edge 69.

Extending from wall 67 is an angled plate 70 which extends for a short distance over the surface of ramp conveyor 60. Angled plate 70 assists in the movement of packages off of the ramp conveyor 60, but is not necessary to operation of the conveying process. The items move off of the ramp conveyor 60 onto a main conveyor 74 which extends in the embodiment at a right angle relative to the ramp conveyor, into the next portion of the system.

The operation of conveyors 48, 52, 54, 60 and speed-up roller 50 is controlled by a series of sensors 62-62 (one for each conveyor) located generally as shown in FIG. 4 and computer-controlled commands. Each conveyor in the system is initiated at its stated speed when the sensor for the next downstream conveyor determines that there is no package/element present at that conveyor. For instance, if the sensor 62 for speed-up roller 50 determines that there is no package present at the roller, then the prior conveyor, buffer conveyor 48, will be activated and will operate at its regular speed to move the package to the speed-up roller 50. This process operates in sequence downstream to ramp conveyor 60. The system operates basically on a queue system, i.e. where there is an opening at one conveyor, the immediate prior conveyor is activated. This results in controlled movement of the packages through the singulating system from the time they are moved onto buffer conveyor 48. By the time the boxes reach the ramp conveyor 60, they are singulated, i.e. they move one by one onto main conveyor 74.

The embodiment shown is effective to singulate individual boxes and will likely be effective with syringes and even cups. For the blister packs, euclid packs and bags, however, a two-axis gantry vacuum pick system for picking the individual units would be effective.

Figure 5:
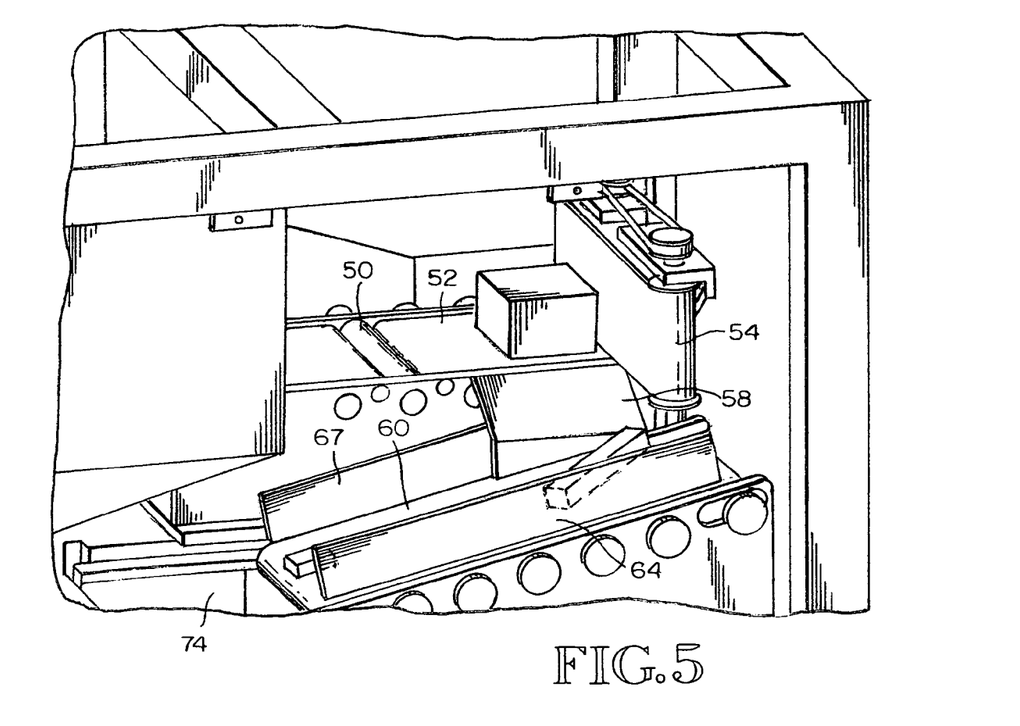
Figure 6:
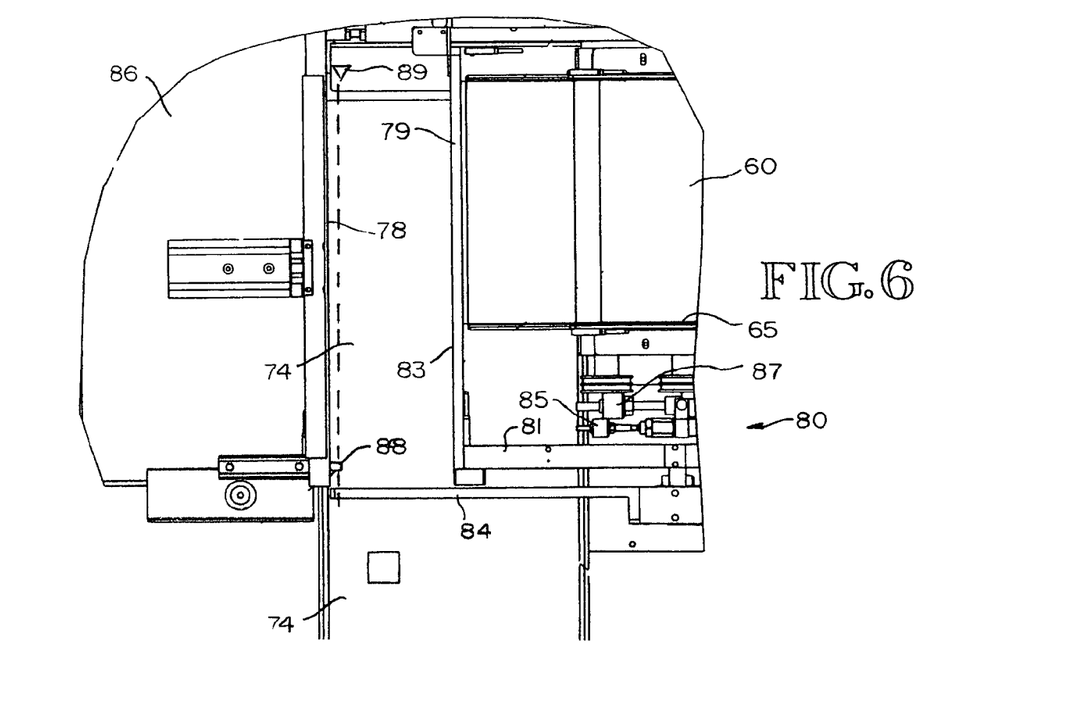
Figure 7:
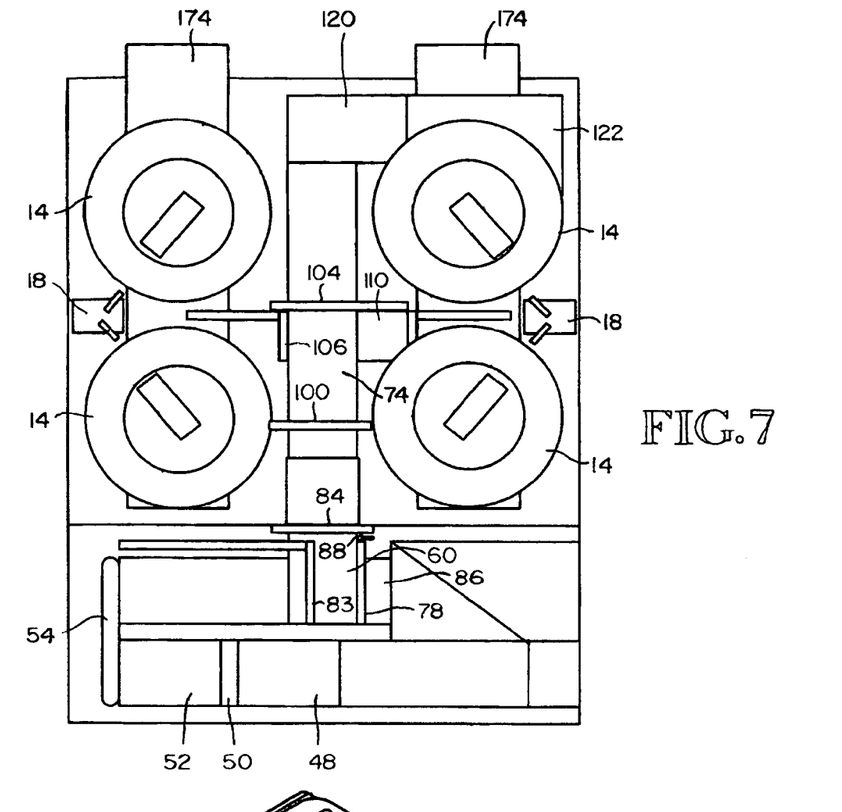
FIG. 7 is a simplified diagram showing the basic operational layout of the system of FIG. 1.

When the packages move onto main conveyor 74, they are first measured and oriented on the conveyor. Along the far edge 76 of the main conveyor is a singulator wall 78. Singulator wall 78 in the embodiment shown is approximately 9-½ inches long by 2 inches high. A singulator shuttle assembly 80 with a shuttle arm 81 is positioned along the far side edge 65 of ramp conveyor 60 and across the end 79 of the ramp conveyor adjacent the main conveyor. The portion of the shuttle assembly which extends across the end of the ramp conveyor 60 is referred to as an alignment bar section 83.

In operation, the packages/items will fall over the alignment bar portion 83 onto the main conveyor. When an item moves onto the main conveyor, the singulator shuttle assembly 80 is activated, moving the alignment bar 83 in a sweeping motion across the main conveyor 74. Since the main conveyor continuously runs, the item will also be moving forward on the main conveyor as the alignment bar 83 moves it across the main conveyor to contact the singulator wall 78. Alternatively, the conveyor 74 could be controlled for interrupted conveying, at selected times, instead of continuous conveying. Interrupted conveying may be more effective for certain types of packages, such as bags and blister packs and Euclid packs.

The forward movement of the item is stopped by a singulator exit gate 84, which extends across the main conveyor but a slight distance above it, permitting the main conveyor to run without interference. The individual items thus become oriented against the singulator wall and the singulator exit gate by action of alignment bar 83 and the forward moving main conveyor.

The singulator shuttle system 80 includes a potentiometer 85 at the end of an extending arm adjacent shuttle arm 81 controlled by a pneumatic cylinder 87. The potentiometer extends to the item which has been pressed against wall 78 by action of the singulator shuttle assembly. The contact with the item by the potentiometer produces a reading (depending upon the distance the potentiometer extends) which is then compared against a look-up table which contains permissible sizes. If the size of the article is out of tolerance for any reasons, such as by damage to the package, singulator wall 78 is raised and the item is pushed into a singulator reject bin 86 by further movement of alignment bar 83.

As the item is moved on conveyor 74, against wall 78, a sensor 89 measures the height of the item. If the item is too high, a singulator tipper pin 88 located in singulator wall 78 at the far edge 76 of the main conveyor is activated, moving horizontally outwardly across the main conveyor, knocking the tall-standing item over on the conveyor. The shuttle assembly is used to again align the item on the conveyor. In the embodiment shown, pin 88 is approximately 2-¼ inches long and located approximately 1-½ inches above the surface of the main conveyor 74.

The identification and orientation/registration of the item on the conveyor in the embodiment described is basically by mechanical/electrical means involving the use of a singulator shuttle gate and an extending potentiometer assembly, positioning the items successively against the singulator structure. However, other devices can be used to identify the item and ensure that it meets specified standards, and that it is aligned/registered appropriately. One such alternative is a visual sensor system, involving a camera which would image the item. Well-known imaging processing technology can then be used to fully identify the item and ensure that it meets specified standards, including size. Other mechanical devices could also be used, such as extending finger-type systems which contact each of the surfaces of the item to determine size. The sensor arrangement would be particularly suitable for bags, blister packs and Euclid packs.

Figure 8:
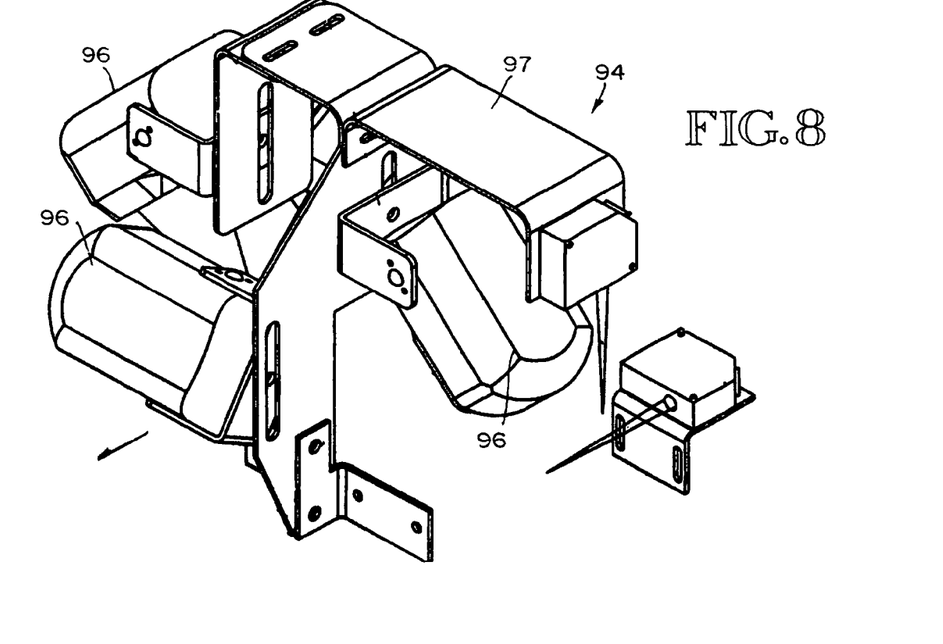
FIG. 8 is a top view showing a scan zone portion of the system of FIG. 1, which follows the singulation of the input packaged elements.

Immediately downstream of the singulator exit gate 84 is a bar code scan system 94 (FIG. 8). The bar code scan system 94 includes four bar code readers 96-96 mounted on a frame 97, which is positioned above the main conveyor 74. The four bar code readers look for bar codes on the four sides of the item. They can also see the top surface as well. The bottom surface of the item (the surface contacting the conveyor) is not scanned by the bar code system 94. The bottom surface is scanned in a downstream portion of the invention, as will be explained hereinafter. If a bar code is recognized by the bar code scan system 94, it is transmitted to the control portion of the system.

After passing under the bar code scan system 94, the package/item is conveyed by the main conveyor 74 to a depot staging gate 100. In the embodiment shown, the main conveyor, which runs continuously, is approximately 6 inches wide and 55 inches long and runs at approximately 10 inches per second. The depot staging gate 100 is located at a distance of approximately 13 inches forward of the singulator exit gate 84. The main conveyor 74 extends from the ramp conveyor to near the exit of the system.

Figure 9:
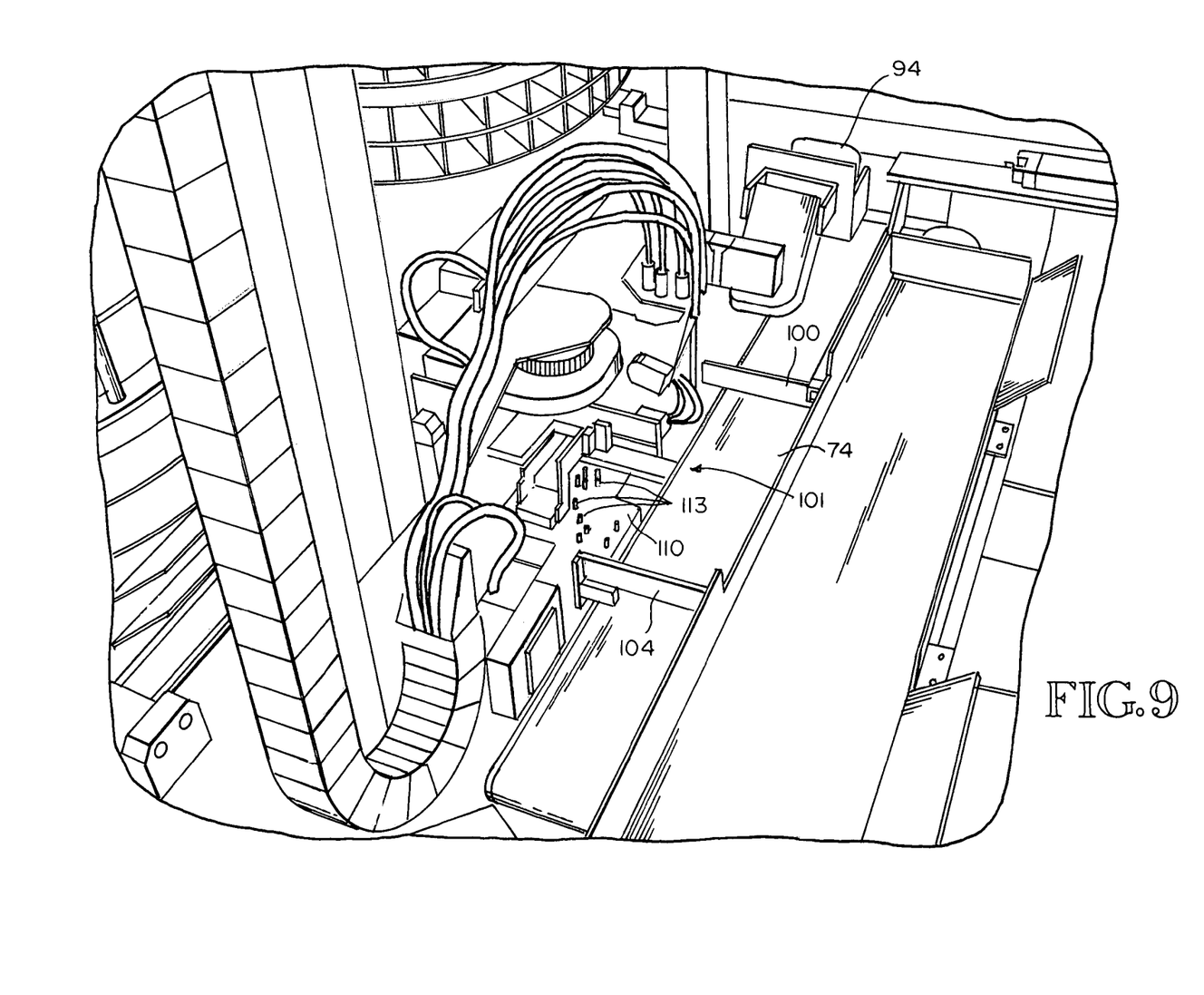
FIG. 9 is a top view showing the main conveyor of the system of FIG. 1 from the singulator exit gate to the end thereof.
Figure 10:
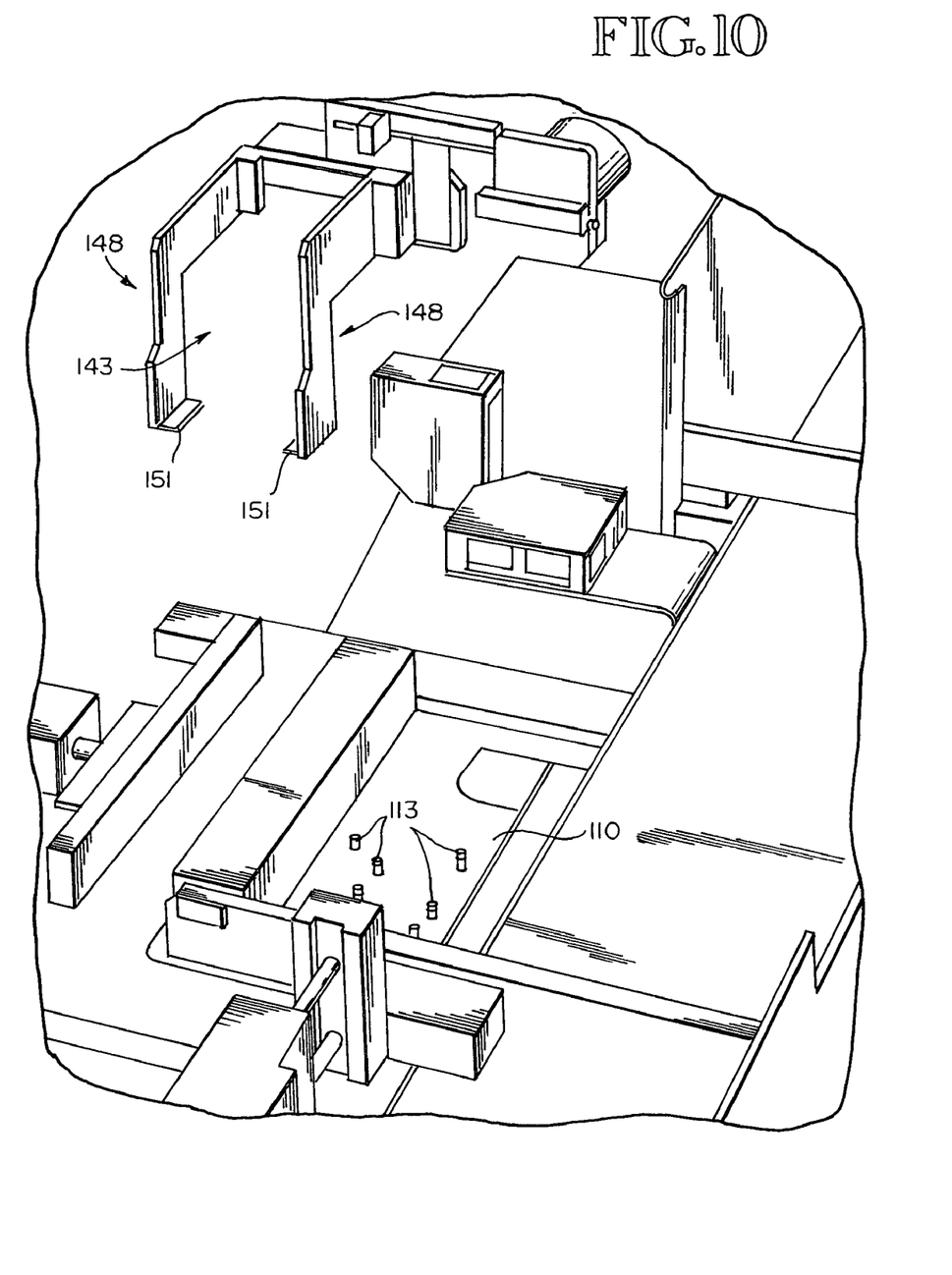
FIGS. 10-11 are top views showing the loading platform of the system of FIG. 1, including various steps in the sequence of operation thereof.
Figure 11:
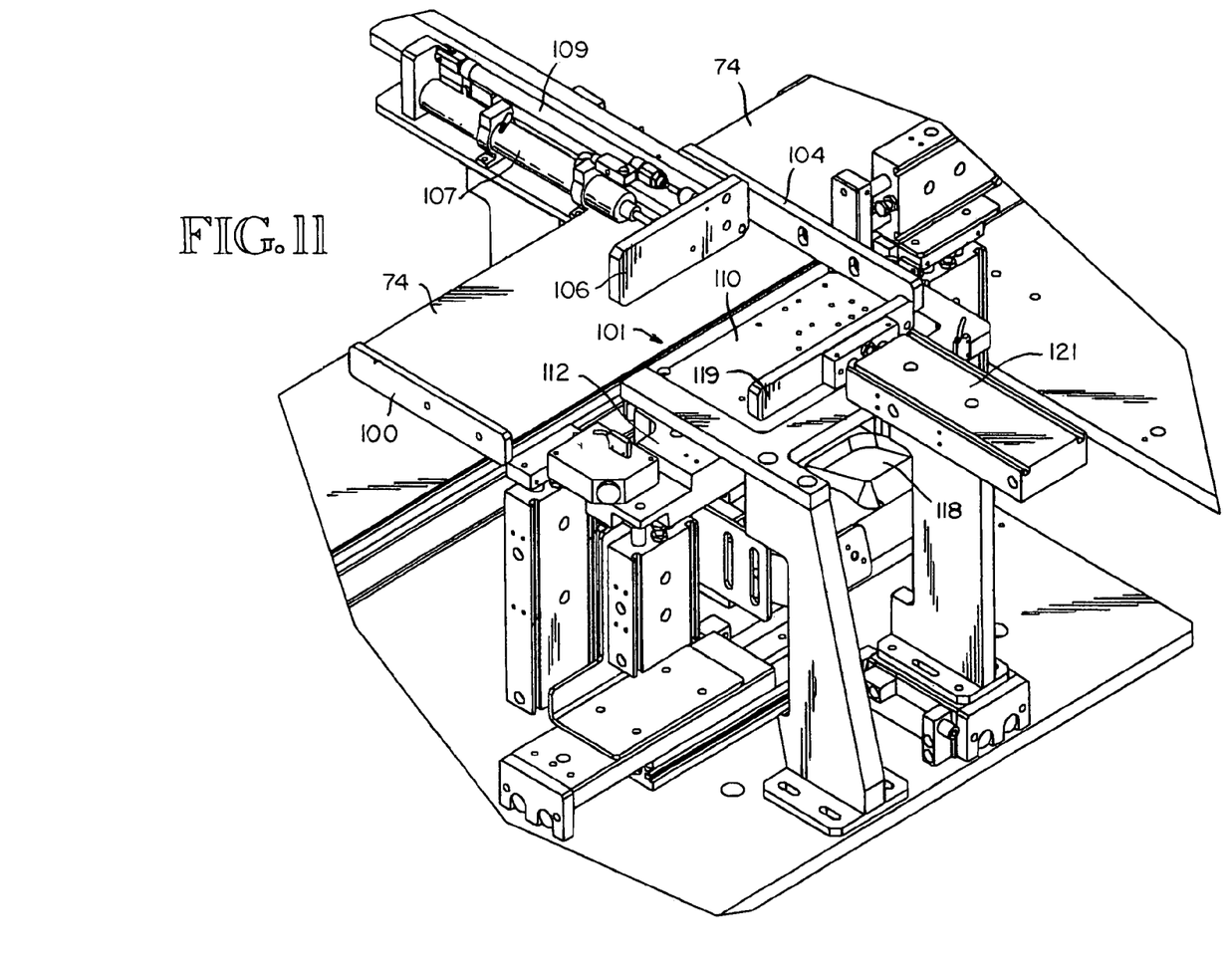

The next portion of the system, downstream from the depot staging gate, is a load platform assembly, shown in FIGS. 9-11. The load platform assembly is referred to generally at 101. When there is an item stopped by the depot staging gate, a load platform sensor (not shown) first determines whether or not horizontal load platform 110 is "clear", i.e. that there is no item presently in position on the load platform. If the load platform 110 is clear, the depot staging gate 100 will be raised and the item will be moved by the main conveyor to the depot stop gate 104, which extends across the main conveyor 74 at the far edge of the load platform.

A transfer shuttle arm 106 extends for approximately 7-½ inches along the main conveyor across from the load platform. Once the item is stopped by the depot stop gate 104, the transfer shuttle 106 is activated and moves to contact the item. A potentiometer 107 and air cylinder 109 are used to measure the box/item again. A laser 111 is used to find the edge of the box. The box is pushed onto the platform portion 110 of the load platform assembly. In the embodiment shown, the platform 110 is made from acrylic plastic and has dimensions of approximately 6 inches by 3-½ inches.

Located beneath platform 110 is a lift plate 112 which has approximately the same exterior dimensions as platform 110. The lift plate 112 has a plurality of pins 113 (FIG. 9) which are mounted in the upper surface of the lift platform and extend upwardly therefrom. The pins are approximately 10 mm high in the embodiment shown. The platform 110 has a plurality of openings therethrough which are in registry with pins 113 in lift plate 112. Lift plate 112 is controlled by a pneumatic actuator (not shown), which moves the platform up and down. When the lift plate 112 is in its lowered position, the upper surface of load platform 110 is flat and co-planar with the main conveyor surface (FIG. 11), permitting an item from the main conveyor to be pushed directly onto the platform 110.

When the lift platform 112 is in its elevated position (FIGS. 9 and 10), pins 113 extend upwardly through the load platform, above the upper surface of the load platform 110 by approximately 5-7 mm. The pins 113 are located so as to be able to reliably support the item on the platform and to lift it above the surface of platform 110. This provides room for the item to be initially gripped by the gripper mechanism, which is explained in more detail hereinafter.

As indicated above, the main conveyor 74 moves items down to the depot stop gate 104, either with continuous movement or interrupted (stop and start) movement. When an item is sensed at the depot stop gate by a sensor (not shown), the transfer shuttle arm 106 is activated and moves across the main conveyor 74, pushing the queued item which is against the depot stop gate 104 onto platform 110. If a barcode has not been previously sensed for the item, i.e. it is on the bottom surface, the lift platform 112 will first transfer out of the way to permit a conventional scan head 118 positioned therebeneath to read the bottom surface of the item. If a barcode is recognized, it is registered with the system control, and the sequence of operations will continue. If no barcode is recognized, then that item is removed from the platform 110 by a transfer bar 119, operated by a pneumatic cylinder 121, which moves the item back onto the main conveyor. The main conveyor 74 will then move the item against the depot stop gate 104, which will lift up, and the item will then be moved to the far end of the main conveyor onto a reject ramp 120, down which the item will slide, depositing it into a second reject box 122.

If a barcode has previously been recognized and registered, or if a barcode is recognized by barcode scanner 118 in the load platform assembly, the lift platform 112 is moved back to its original position. A slot number in one of the drum storage element 14-14 is at this point assigned to the element by the system controller. As indicated above, when the lift platform 112 is activated and is in its elevated position, pins 113 extend through the load platform 110, lifting the item off of the surface of the load platform. Once the pins 113 extend through platform 110 to lift the item, the transfer shuttle 106 and the depot stop gate 104 are both retracted to allow the gripping and storing assembly to get into position and to allow opposed grip elements 148 to grasp the item.

FIGS. 9, 10 and 13, 14 show the gripping and storing assembly of the present invention. As indicated above with respect to FIG. 1, the present invention includes a single gripping and storing assembly which services four drum storage assemblies 14-14. Each drum storage assembly includes a plurality of individual horizontal slots which are open at both the front and rear ends thereof. Each drum storage assembly is in the shape of a cylinder which is open at the center thereof. The cylinder includes a plurality of ring portions (shelves) which are stacked in a vertical sequence, separated by vertical walls. The rings and walls define individual slots. The spacing between the rings and the walls may be varied to define different size and configured storage slots. In the embodiment shown, four different size slots are shown. The arrangement, size and configuration of the storage slots can be changed to accommodate the size of the elements and the particular elements to be stored. For instance, the individual slots will differ in size depending on the particular package to be stored, e.g. bags, boxes, packs or syringes, among others.

In the embodiment shown for boxes, the outer diameter of the drum storage devices 14 is approximately 19 inches, while the inner diameter is approximately 14 inches. In the embodiment shown, each drum storage assembly is made out of metal or similar rigid material. Each drum storage assembly is rotatable by a motor 120 and a belt drive, which extends around a pulley (not shown) at the lower end of each drum. In the embodiment shown, motor 120 is a servo motor which provides the ability to control the precise rotational position of each drum storage assembly so as to make each storage slot in the drum accessible to a gripping and storing assembly.

Figure 12:
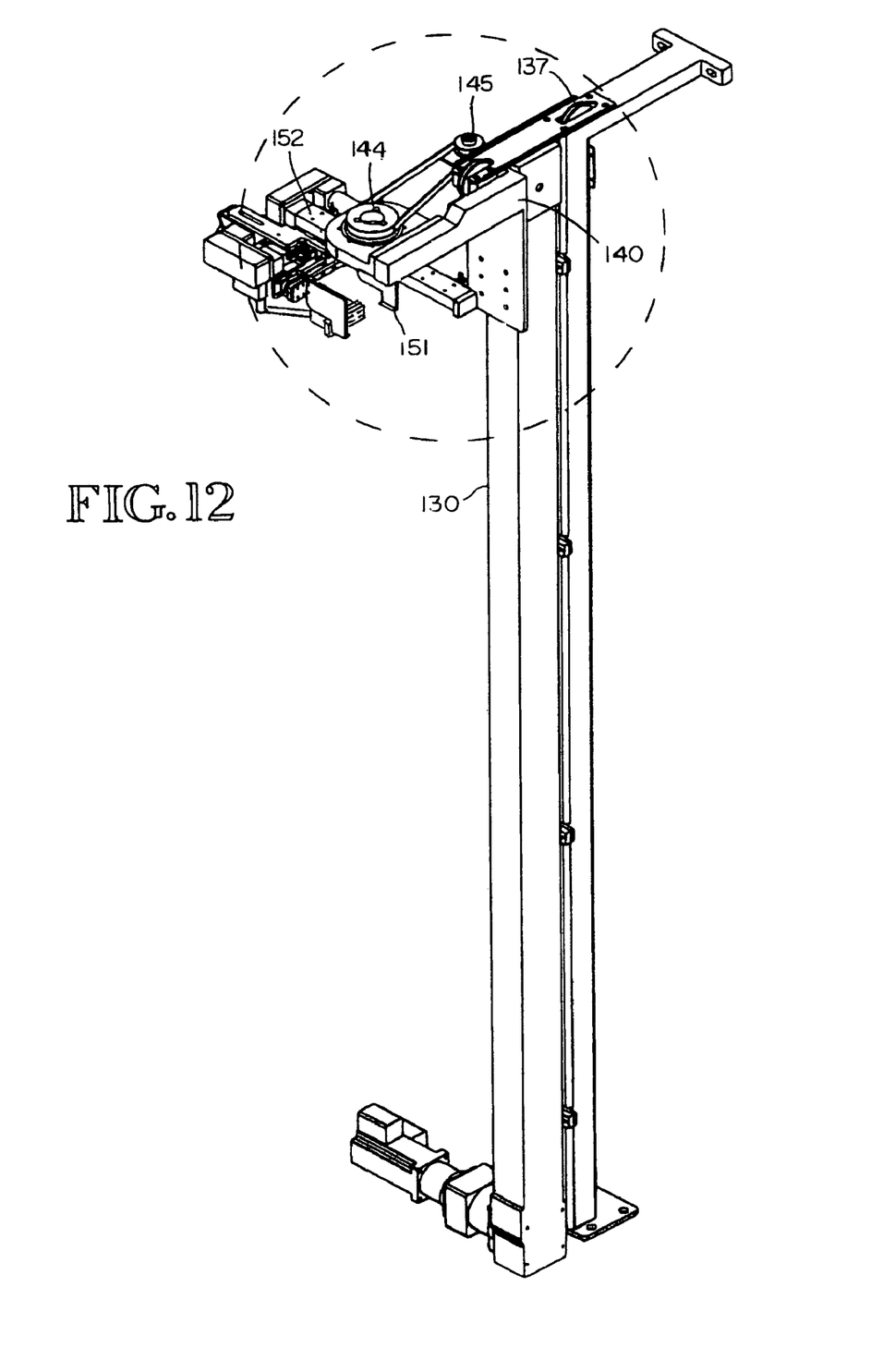
FIGS. 12-13 show views of the gripper portion of the system of FIG. 1, including the movement of packaged elements from the loading platform into the drum storage assemblies.
Figure 13:
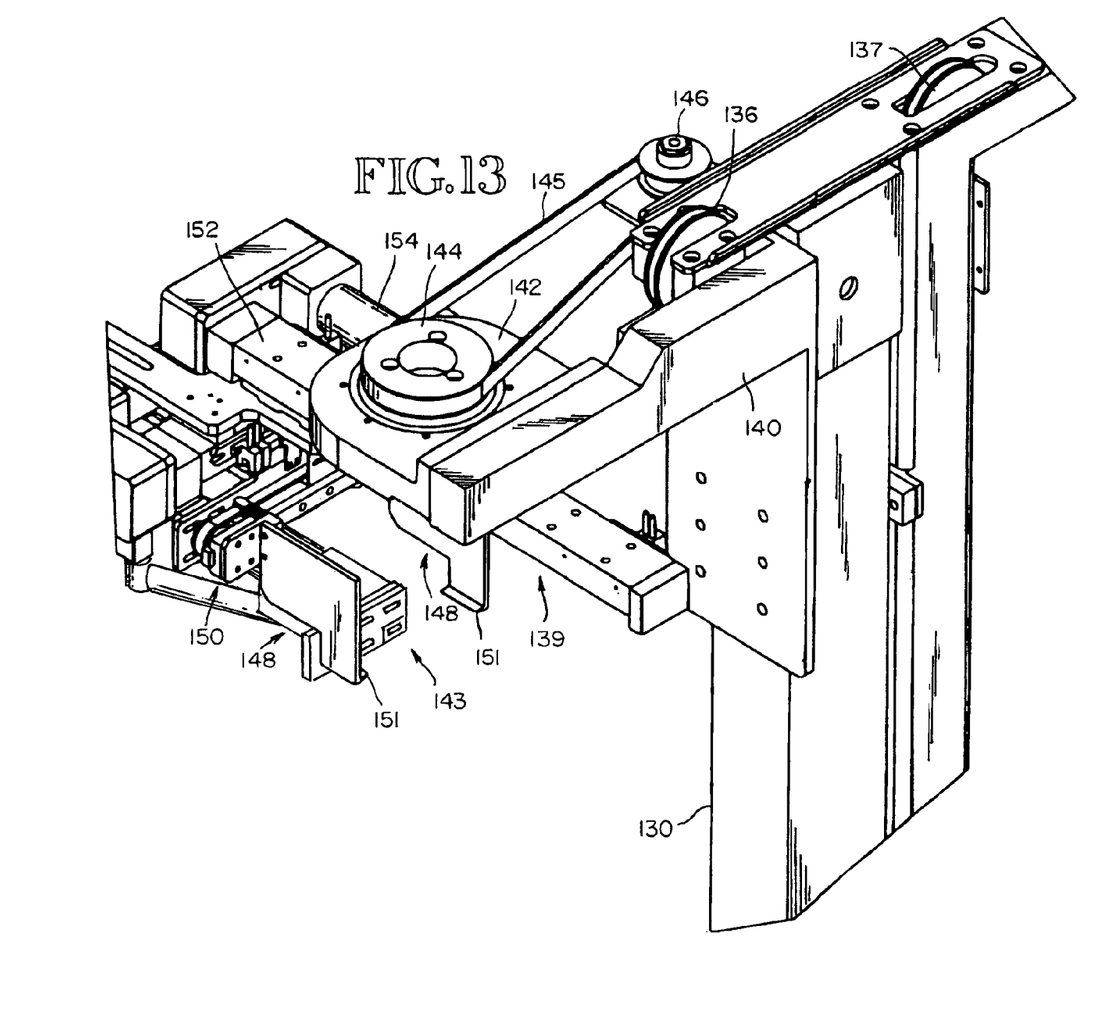

Referring to FIGS. 12 and 13, the gripping and storing assembly includes an elongated tower element 130 which extends for approximately the height of each drum storage assembly 14. The gripping and storing assembly includes a servo motor 132 which through a gear box 134 drives a lower pulley (not shown), all located at the base of the tower 130. A drive belt extends from the base pulley up the tower and around an upper pulley (not shown) located at the top of the tower. Pulleys 136 and 137 are used with a counterweight which assists in control over movement of a gripper support assembly 139.

The gripper support assembly 139 includes a support arm 140 which extends horizontally outwardly from tower 130. Extending from arm 140 is a mounting plate 142. Rotatably connected to mounting plate 142 is a grip element assembly 143. The grip element assembly 143 includes a belt-driven pulley 144, which is positioned at the upper surface of mounting plate 142. A belt 145 is capable of moving the grip element assembly in a rotational direction by means of a servo motor 146.

The grip element assembly also includes two opposing grip arms 148, located below plate 142, which include vertical portions and a narrow ear 151 at the lower ends thereof, the two narrow ears 151-151 extending toward each other. The grip arms 148 move toward and away from each other under the control of a motor/belt arrangement, shown at 150. Operation of the motor/belt arrangement 150 permits the grip arms 148 to first move away from each other, allowing the ear portions 151-151 to be positioned beneath the box/item on the loading platform and then to move toward each other to obtain a firm grasp on the item. Mounted on the undersurface of plate 142 is a linear actuator 152, which is controlled by a motor 154 or an air cylinder. The linear actuator 152 moves back and forth in the axial direction, taking with it the grip element assembly.

The grip element assembly also includes a pusher arm 156 which is controlled by a pneumatic actuator. The pusher arm is located between grip arms 148 and in operation moves forward against an item held by grip arms 148. Positioned in the free end of pusher arm 156 is a push pin element 158. Push pin 158, when actuated, extends out beyond the end of pusher arm 156 and provides a final force for moving the item into the correct assigned cell of the drum storage 14.

In operation, the gripping and storing assembly has four degrees of freedom. The gripper support assembly moves up and down tower 130 (the vertical direction) by means of the servo motor/gearbox/belt/pulleys/counterweight arrangement. The balance for the gripper support assembly is provided by the counterweight, which moves up and down, allowing improved control over the gripper support assembly. The grip arms 148 are moved toward and away from each other by motor and belt arrangement 151 to grip and release each package/item. The grip element assembly is both rotatable by the motor, belt and pulley arrangement and movable axially along linear actuator 152 by the action of motor 154. Finally, a pusher arm and extending pin arrangement move the item from the grip arms 148 into a selected storage slot in a drum storage 14.

It should be understood that while the gripping and storing assembly shown and described is preferred for the particular present application of medications which have been overpackaged, or for other boxed elements, other grasping systems can be used. For instance, a low profile vacuum chuck system, whereby a vacuum head portion contacts an item on the load platform and raises the item by a vacuum (suction) action is an alternative possibility. Elevating pins would not be necessary in such an embodiment. Similar systems are known for other applications. It is also possible to use other arrangements, such as magnetic, where part of the packaging or the item itself is magnetic. A robotic finger system could be another alternative. There are various ways and mechanisms for picking up medications or other items from a conveyor or a load platform and then placing them into assigned locations in a storage device.

Figure 14:
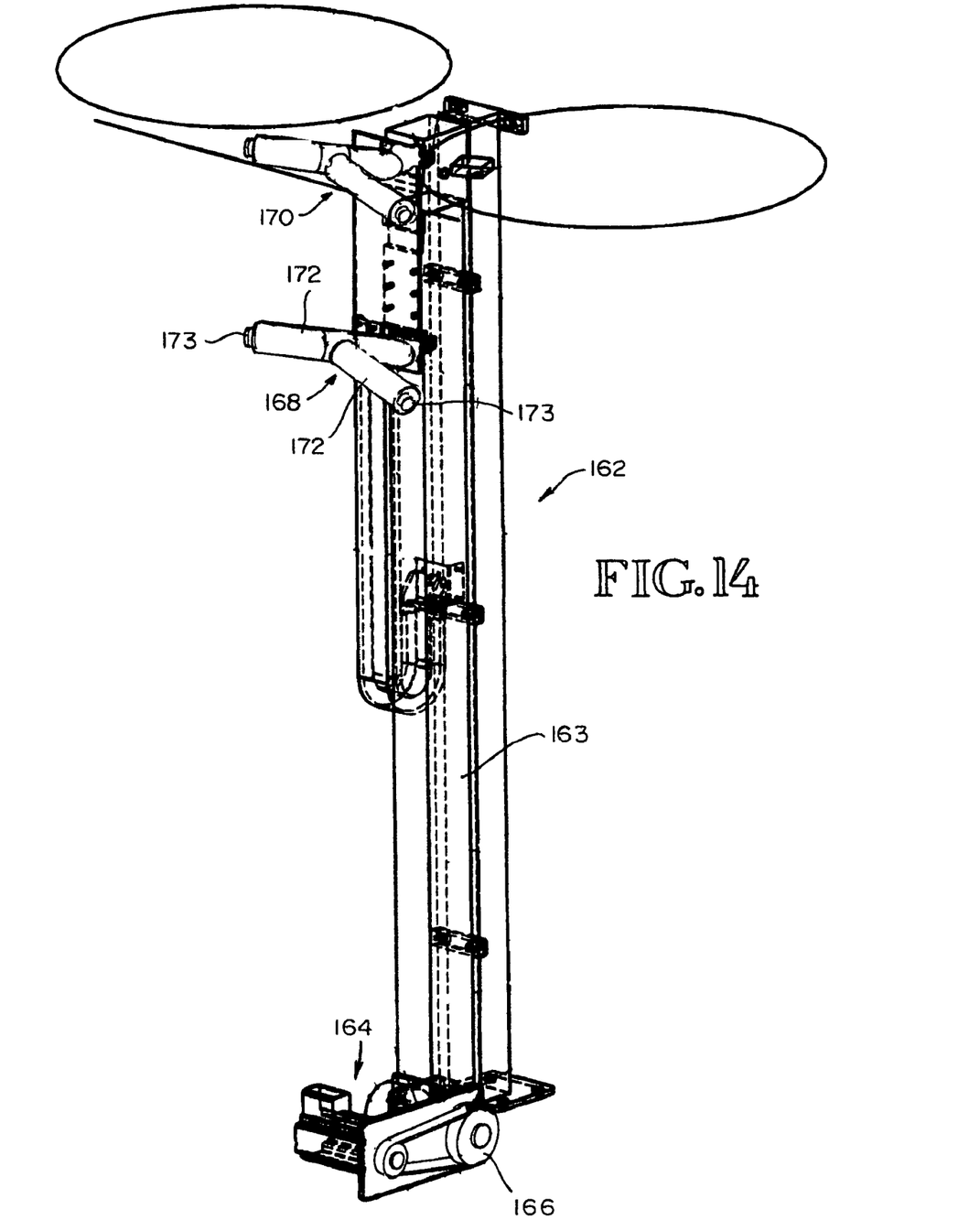
FIG. 14 shows the element ejector portion of the system of FIG. 1 for ejecting stored elements into an output conveyor for delivery out of the system.

The system of the present invention also includes two ejector assemblies 18, shown in detail in FIG. 14. The ejector assemblies are located near opposing edges of the system, between two adjacent drum storage elements. Each ejector assembly in the embodiment shown serves two drum storage units. This could be changed, however. Each ejector assembly 18 includes a tower 162, on which is mounted a belt 163 driven by a servo motor 164 and a pulley system 166. Each ejector assembly includes two ejector units 168 and 170, with each ejector unit having two fixed ejector arms 172, which are arranged at an angle of 30° relative to each other in the embodiment shown. The ejector units 168 and 170 move together up and down the tower, covering the entire height of the tower, with unit 170 covering an upper portion of the tower and unit 168 covering the remaining portion.

At the end of each arm is a sensor 173 which verifies that the desired item to be ejected is present in the selected slot in the drum storage assembly. If not, an inventory error is noted for the control system. If the item is present, a command is provided and an ejection cylinder extends the arm 172 which pushes the item from the ejection assembly into the center of the drum storage device, where it falls down to an output conveyor 174. Each pair of drum storage assemblies in the embodiment shown, served by a single ejection assembly, has an output conveyor located beneath them to carry the item out of the system. The ejection sensor 173 on the arm 172 recognizes that the selected item has been ejected. The ejection cylinder is then withdrawn.

In operation, to eject a selected item from the apparatus, the drum storage assembly is first rotated so that the cell in the drum storage containing the item to be dispensed is in line with an ejection arm from the ejection assembly. The ejection cylinder is then activated, pushing the item into the center of the drum storage device. The conveyor therebeneath, being activated, will move the dispensed item out of the system into a container or perhaps onto another conveyor (22 in FIG. 1), which will move the item to another location for further processing, such as loading into a medication cart.

An alternative to the electromechanical arrangement of FIG. 14, involving ejection arms, is an air nozzle arrangement, in which the stored items are removed by air pressure. The air nozzle arrangement would be particularly effective with bags, blister packs and euclid packs.

Hence, a system has been described which has the capability of receiving items, such as medications in bulk, including returned medications, singulating them and then identifying and confirming that they are within tolerance. The items are then oriented on a conveyor in the embodiment shown, and then moved to a loading platform, where a gripper and storage assembly, or a vacuum arrangement, moves them into the bulk storage units. The same system is thus capable of concurrently storing medications or other elements, including returns, and dispensing them upon command out of the apparatus to a container or a conveyor.

Although a preferred embodiment of the invention has been described for purposes of illustration, it should be understood that various changes, modifications and substitutions can be made in that embodiment, in addition to the alternatives discussed above, without departing from the spirit of the invention as defined by the claims which follow.

What is claimed is:

1. A method for storing and dispensing individual elements, comprising:

temporarily storing a plurality of individual elements in a storage area;

removing the elements from the storage area;

depositing the elements one by one onto a conveyor;

moving the elements along the conveyor to a loading mechanism;

removing the elements from the conveyor with the loading mechanism and positioning them so that they are ready to be stored;

individually moving the positioned elements with a moving assembly to a mass storage apparatus containing a plurality of individually addressable storage locations;

storing each element in one of the locations in the mass storage apparatus; and using a dispensing assembly, dispensing a selected individual element from a known location in the mass storage apparatus.

2. A method as in claim 1, wherein the individual elements are medical elements, and singulating the elements before depositing them on the conveyor.

3. A method as in claim 2, wherein the elements are removed from the storage area with a singulating system that includes a series of four conveyors and a speed-up roller, including a first conveyor which is followed by a speed-up roller; a second conveyor receiving elements from the speed-up roller; a third, vertically oriented conveyor guiding elements from the second conveyor, the third conveyor extending at approximately a right angle to the second conveyor; and a fourth conveyor which moves the elements guided by the third conveyor onto the system conveyor.

4. A method as in claim 3, wherein the singulating apparatus includes at least one sensor for each conveyor portion thereof and wherein the operation of one of the singulating conveyors is initiated when a sensor for the next downstream conveyor or roller senses that there is no element present at that location.

5. A method as in claim 1, further comprising operating the moving assembly and the storage apparatus independently of the dispensing assembly.

6. A method as in claim 1, wherein said storage area comprises a bin that includes a hopper having a gated opening for receiving said individual elements therethrough, wherein the hopper includes at least two downwardly and inwardly angled walls for urging the received elements down to a bottom portion of the hopper.

7. A method as in claim 6, further comprising providing a stair-stepper mechanism for moving the individual elements out of the hopper to a start portion.

8. A method as in claim 6, wherein the stair-stepper mechanism includes two alternating sets of separate plates, one set being fixed in position, the other set moving, wherein operation of the moving plates moves the individual elements upwardly along a series of successive step-like portions of the fixed plates.

9. A method as in claim 1, further comprising inspecting the individual elements when they are deposited onto the system conveyor.

10. A method as in claim 4, wherein individual elements are inspected using an inspecting means that includes a movable arm which when actuated moves an item deposited on the system conveyor into contact with a far wall bounding the system conveyor, wherein the arm includes a potentiometer element for determining whether the element is within predefined standards, so that a damaged element container can be identified.

11. A method as in claim 10, further comprising providing an actuating member for moving the far wall when the element is not within the predefined standards, permitting the element to be pushed off the system conveyor and into a first reject deposit member by said moveable arm.

12. A method as in claim 11, wherein the inspecting means includes a pin-like element which is selectively activated to knock down a tall element present on the system conveyor so that it presents a lower profile.

13. A method as in claim 10, further comprising using the inspecting means to visually identify the element and to determine whether the element meets preselected criteria.

14. A method as in claim 1, further comprising providing a scan system for reading a barcode on a surface of the element.

15. A method as in claim 14, further comprising moving the element to a second reject area if no bar code is detected.

16. A method as in claim 1, wherein the loading mechanism includes a loading platform upon which the element is moved from the main conveyor, and a lift platform located therebeneath having pins extending therefrom, and activating the lift platform such that the pins move through corresponding openings in the load platform to elevate the element so that it can be conveniently gripped.

17. A method as in claim 16, further comprising using a pair of gripping arms toward and away from each other to grab the element elevated on the pins.

18. A method as in claim 1, further comprising packaging the elements in a package selected from a group consisting of a bag, a blister pack and an euclid pack.

19. A method as in claim 1, further comprising sensing whether or not the location in the mass storage apparatus is vacant.

20. A method as in claim 1, wherein the dispensing assembly includes a dispensing tower member, an ejector assembly mounted for vertical movement on the dispensing tower member, the ejector assembly including two sets of angled ejector arms, each set operating independently of the other set and covering a selected portion of the vertical dimension of the mass storage apparatus.

21. A method as in claim 20, wherein the ejector arm moves toward and away from the mass storage apparatus, contacting the selected element in an open cell as it moves toward the main storage apparatus, ejecting the stored element into an open center portion of each mass storage apparatus, and providing a conveyor beneath the mass storage apparatus for carrying the dispensed element.

* * * * *